(12) United States Patent
Suzuki et al.

(10) Patent No.: US 8,642,229 B2
(45) Date of Patent: Feb. 4, 2014

(54) ELECTROCHEMICAL REACTOR UNITS AND MODULES AND SYSTEMS COMPOSED OF THEM

(75) Inventors: Toshio Suzuki, Nagoya (JP); Toshiaki Yamaguchi, Nagoya (JP); Yoshinobu Fujishiro, Nagoya (JP); Masanobu Awano, Nagoya (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 470 days.

(21) Appl. No.: 12/469,440

(22) Filed: May 20, 2009

(65) Prior Publication Data
US 2009/0291347 A1    Nov. 26, 2009

(30) Foreign Application Priority Data

May 22, 2008 (JP) .................................. 2008-134846
Feb. 25, 2009 (JP) .................................. 2009-042983

(51) Int. Cl.
*H01M 8/10*    (2006.01)

(52) U.S. Cl.
USPC ........................................................ 429/497

(58) Field of Classification Search
USPC ........................................................ 429/497
See application file for complete search history.

(56) References Cited

U.S. PATENT DOCUMENTS

| 6,033,794 A * | 3/2000 | George et al. ................. 429/423 |
| 2007/0141423 A1 | 6/2007 | Suzuki et al. |
| 2007/0224481 A1 | 9/2007 | Suzuki et al. |

FOREIGN PATENT DOCUMENTS

| JP | 2004-335277 | 11/2004 |
| JP | 2004335277 A * | 11/2004 ............... H01M 8/02 |

OTHER PUBLICATIONS

Hibino, et al., An Intermediate-Temperature Solid Oxide Fuel Cell Providing Higher Performance with Hydrocarbons than with Hydrogen, Aug. 27, 2002, The Electrochemical Society, 5(11), A242-A244.*
Z. Shao and S.M. Haile, Nature 431 170-173 (2004).
T. Hibino, A. Hashimoto, K. Asano, M. Yano, M. Suzuki and M. Sano, Electrochem. Solid-State Lett, 5 (11) A242-A24 (2002).

* cited by examiner

*Primary Examiner* — Karie O'Neill Apicella
(74) *Attorney, Agent, or Firm* — Oblon, Spivak, McClelland, Maier & Neustadt, L.L.P.

(57) ABSTRACT

The present invention is an electrochemical reactor unit in which a plurality of electrochemical reactor cells constituted by a tube are housed in a porous material body having a heat releasing function and a current collecting function, these are electrically connected in series, and a fuel manifold is mounted to the connected electrochemical reactor cells; an electrochemical reactor module that comprises a plurality of the units which are arranged in fuel supply holes, and a structure supplying air directly to the entire electrochemical reactor module; and an electrochemical reaction system in which such an electrochemical reactor module is utilized.

6 Claims, 16 Drawing Sheets

ELECTROCHEMICAL REACTOR UNITS AND MODULES AND SYSTEMS COMPOSED OF THEM

BACKGROUND OF THE INVENTION

1. Field of the Invention

The present invention relates to an electrochemical reactor unit composed of an electrochemical reactor cell stack, and to an electrochemical reaction system, such as a solid oxide fuel cell, made up of these electrochemical reactor cell stacks, and more particularly relates to an electrochemical reactor unit, electrochemical reactor module, and electrochemical reaction system that make use of tube-type electrochemical reactor cells and that afford a marked increase in the output per unit of volume.

The present invention provides a novel technique and a novel product relating to an electrochemical reactor unit and reactor module that can be used to advantage as an electrochemical reaction system such as an environmental purification apparatus or a clean energy source, and to an electrochemical reaction system in which such a reactor module is utilized.

2. Description of the Related Art

A solid oxide fuel cell (hereinafter referred to as SOFC) is a typical example of an electrochemical reactor. An SOFC is a fuel cell in which a solid oxide having ion conductivity is used as an electrolyte, and a solid oxide having electron conductivity is used as an electrode. The basic structure of an SOFC usually comprises three layers: an air electrode (cathode), electrolyte, and a fuel electrode (anode), and is usually used at a temperature between 800 and 1000° C.

When a fuel gas (such as hydrogen, carbon monoxide, or a hydrocarbon) is supplied to the anode of the SOFC, and air, oxygen, or the like is supplied to the cathode, a differential is produced between the oxygen partial pressure on the cathode side and the oxygen partial pressure on the anode side, and this produces voltage between the electrodes according to Nernst's formula. Oxygen becomes ions at the cathode, which move through the solid electrolyte to the anode side, and the oxygen ions that reach the anode react with the fuel gas and release electrons. Accordingly, if a load is connected to the anode and cathode, electricity can be taken off directly.

For SOFCs to see practical application in the future, their operation temperature needs to be lowered (600° C. or lower), and an effective means to this end is to use of an electrolyte material having high ion conductivity and to use an electrolyte thin film. A thin film of electrolyte can be obtained by using a support made of an electrode material, so a great deal of research has gone into this, particularly for anode support-type cells.

If the operating temperature could be lowered to between 500 and 600° C., we would be able to use less expensive materials and bring down the operating costs, and this should make SOFCs more versatile. Novel anode and cathode materials have been proposed in the past, and it has beer reported that a flat type of SOFC having a high power output of 0.8 to 1 W/cm$^2$ even at a low temperature (600° C.) can be constructed (see Z. Shao and S. M. Haile, *Nature*, 431, 170-173 (2004); and T. Hibino, A. Hashimoto, K. Asano, M. Yano, M. Suzuki, and M. Sano, *Electrochem. Solid-State Lett.*, 5 (11), A242-A244 (2002)).

However, the anode support-type SOFCs having a high power output that have been reported on up to now are flat, and under conditions of a harsh operating cycle, a problem is that the cell can sometimes fail. The reason for this is that the nickel-cermet that is commonly used undergoes a large change in volume due to temperature changes or redox atmosphere cycling, and this causes strain in the cell and leads to failure.

Consequently, if SOFCs are to see practical use, one of the greatest technological challenges is to increase the size and build stacks while still preserving the performance of the flat cell. It is also important, in terms of boosting performance, to reduce thickness and control the electrode structure of the anode support substrate, but up to now it was difficult to reduce the thickness and raise porosity with a flat cell. An SOFC structure composed of a tubular cell has also been the subject of research as a structure that could replace flat cells (see Japanese Patent Application Laid-Open No. 2004-335277).

With stacks or bundles composed of tube-type cells that have been proposed in the past, the structure was such that, for example, tube-type cells are stably supported by an integrating structure composed of a cathode material, and an electrode integrating sheet or the like is used to collect current from the anode and cathode portions.

However, with the structure of existing tube-type cell bundles and stacks, as the integration density of the tubes rose, it became more difficult to control the temperature because of heat generated during operation of the stack, and the air pressure loss increased. Therefore, there has been an urgent need in this field of technology for the development of a new way to solve these problems.

In the midst of this situation, the inventors conducted diligent research in light of the above-mentioned prior art and aimed at developing an SOFC structure with which the problems encountered with the above-mentioned conventional product members can be effectively solved, and new modes for using this structure. As a result, the inventors perfected the present invention upon conducting further research following new findings such as a handle structure having a heat dissipation function and current collecting function in which tube-type cells with a small diameter are arranged, the fact that a method for stacking these cells can be constructed, and the fact that an electrochemical reactor module can be constructed as an electrochemical reaction system that utilizes these stacked units and affords a reduction in the operating temperature.

SUMMARY OF THE INVENTION

Specifically, it is an object of the present invention to provide electrochemical reactor units constituted by an electrochemical reactor cell stack with which current can be efficiently collected from a tube-type electrochemical reactor cell having a tube cell structure that allows operation at a lower temperature, and with which heat control is easy even when the cell structures are stacked in multiple layers, and air pressure loss can be reduced, as well as an electrochemical reactor module constituted by these units. It is a further object of the present invention to provide an electrochemical reaction system such as a solid oxide fuel cell that makes use of electrochemical reactor units in which the above-mentioned tube-type electrochemical reactor cells are stacked.

The present invention for solving the above problems is constituted by the following technological means.

(1) An electrochemical reactor unit, that comprises tube-type electrochemical reactor cells, a porous material body having a heat releasing function and a current collecting function, and fuel supply means, the tube-type electrochemical reactor cells are constituted by a tube with a micro-size diameter and having a tube structure and are housed in the porous material body, the plurality of electrochemical reactor cells have a gas seal member and a collector member attached to said porous material body and are electrically connected in series and one-dimensionally in a direction in which the tube-type electrochemical reactor cells are arranged, and the fuel supply means is mounted to the connected electrochemical reactor cells.

(2) The electrochemical reactor unit according to (1) above, wherein the tube structure is an anode tube structure constituted by a ceramic hollow tube, a dense electrolyte layer is formed in said anode tube, a cathode is disposed on the outside of said electrolyte layer, an anode exposed part on which no electrolyte is laminated is formed at one end of the anode tube, the thickness of the tube is at most 0.5 mm, and the diameter of the tube is micro-size, being no more than 2 mm.

(3) The electrochemical reactor unit according to (1) or (2) above, wherein the electrochemical reactor cells constituted by a tube having a tube structure are one-dimensionally arranged and integrated on a porous collector body which have a function of collecting current from the cathode and a function of releasing heat during cell operation.

(4) The electrochemical reactor unit according to (1) or (2) above, wherein the porous material body is composed of a metal and/or a conductive ceramic.

(5) The electrochemical reactor unit according to (1) above, wherein the fuel supply means is a tube-type fuel manifold.

(6) An electrochemical reactor module that comprises a plurality of the electrochemical reactor units defined in any of (1) to (5) above which are arranged in fuel supply holes, and a structure for supplying air directly to the entire electrochemical reactor module.

(7) The electrochemical reactor module according to (6) above, wherein the electrochemical reactor module is disposed in a module housing case, and an air inlet and an air outlet are formed in said housing case so that air is supplied directly to the entire module.

(8) An electrochemical reactor system, that comprises the electrochemical reactor module defined in (6) or (7) above, having a low operating temperature of no higher than 650° C.

(9) The electrochemical reaction system according to (8) above, wherein the electrochemical reaction system is a solid oxide fuel cell, or a system for cleaning exhaust gases, manufacturing hydrogen, or manufacturing synthesis gas.

The present invention will now be described in further detail.

The present invention is an electrochemical reactor unit, in which tube-type electrochemical reactor cells constituted by a tube with a micro-size diameter and having a tube structure are housed in a porous material having a heat releasing function and a current collecting function, a plurality of electrochemical reactor cells in which a gas seal and a collector are attached to the porous material body are electrically connected in series and one-dimensionally in a direction in which the tube-type electrochemical reactor cells are arranged, and fuel supply means is mounted to the connected electrochemical reactor cells. In a preferred embodiment of the present invention, the fuel supply means is a tube-type fuel manifold.

Also, in a preferred embodiment of the present invention, the tube structure is an anode tube structure constituted by a ceramic hollow tube, a dense electrolyte layer is formed in the anode tube, a cathode is disposed on the outside of the electrolyte layer, an anode exposed part on which no electrolyte is laminated is formed at one end of the anode tube, the thickness of the tube is at most 0.5 mm, the diameter of the tube is micro-size, being no more than 2 mm, and the porous material is composed of a metal and/or a conductive ceramic.

The present invention is also an electrochemical reactor module in which a plurality of the above-mentioned electrochemical reactor units are arranged in fuel supply holes, the electrochemical reactor module having a structure in which air is supplied directly to the entire module. The present invention is also an electrochemical reaction system constituted by the above-mentioned electrochemical reactor module, wherein the operating temperature is no higher than 650° C. In a preferred embodiment of the present invention, the electrochemical reaction system is used in a solid oxide fuel cell, to clean exhaust gases, to manufacture hydrogen, or to manufacture synthesis gas.

The electrochemical reactor unit of the present invention is characterized by having a structure in which electrochemical reactor cells, in which an anode (fuel electrode) material having a tube structure, a dense ion conductor (electrolyte), and a cathode (air electrode) material are laminated, are housed in a porous material having a heat releasing function and a current collecting function, and the resulting bundles are integrated. FIG. 1 illustrates an example of the basic structure of the electrochemical reactor module pertaining to the present invention, in which electrochemical reactor units have been put in module form.

Next, the tube-type electrochemical reactor pertaining to an embodiment of the present invention, an electrochemical reaction system constituted by these, and so forth will be described in detail. First, the structure of the tube-type electrochemical reactor cells pertaining to the present invention will be described. FIG. 2 is a simplified diagram of the basic structure of the tube-type electrochemical reactor cell pertaining to the present invention. As shown in FIG. 2, with the tube-type electrochemical reactor cell of the present invention, a layer of electrolyte composed of a dense electrolyte 1 is formed on the outside of an anode tube 2 constituted by a ceramic hollow tube.

A cathode 3 is disposed on the outside of this electrolyte layer, and a tube hole 4 and an anode exposed part 5 are formed to construct the tube-type electrochemical reactor cell pertaining to the present invention. Usually, with the conditions under which a fuel cell is used, hydrogen, carbon monoxide, methane, or another such fuel gas is supplied to the tube hole 4, and air, oxygen, or the like is supplied to the outside of the tube.

The tube that is part of the tube-type electrochemical reactor cell pertaining to the present invention here is preferably constituted by a ceramic hollow tube that has a thickness of 0.5 mm or less, and has a diameter that is micro-size, being 2 mm or less. For example, this diameter is from 2 to 1 mm, around 1 mm, from 1 to 0.3 mm, around 0.8 mm, from 0.8 to 0.5 mm, or around 0.5 mm. Better anode performance can be obtained if the tube thickness is 0.5 mm or less. Also, if the tube diameter is within the above-mentioned range of 2 mm or less, then even if the tube thickness is 0.5 mm or less, it will still be possible to design and construct a tube structure that maintains strength while also affording an electrode structure with high porosity.

In designing the cell stack, there are basically no restrictions on the length of the tube, and it can be determined as desired so as to obtain the characteristics necessary in an anode, while taking into account the overall size of the electrochemical microreactor that is needed. Also, the porosity of the tube is preferably at least 30% in order to diffuse the high-speed gas and accelerate the reduction reaction.

Next, a material that affords good ion conduction must be used as the electrolyte material constituting the electrolyte layer. Favorable examples of materials that can be used for this include oxide compounds containing two or more elements selected from the group consisting of Zr, Ce, Mg, Sc, Ti, Al, Y, Ca, Gd, Sm, Ba, La, Sr, Ga, Bi, Nb, and W.

Examples of particularly favorable materials include stabilized zirconia that has been stabilized with yttria ($Y_2O_3$), calcia (CaO), scandia ($Sc_2O_3$), magnesia (MgO), ytterbia ($Yb_2O_3$), erbia ($Er_2O_3$), or another such stabilizer, and ceria ($CeO_2$) doped with yttria ($Y_2O_3$), gadolinia ($Gd_2O_3$), or samaria ($Sm_2O_3$). It is preferable if the stabilized zirconia has been stabilized with one or more of the above-mentioned stabilizers.

More specifically, favorable examples include yttria-stabilized zirconia (YSZ) in which yttria has been added in an amount of 5 to 10 mol % as a stabilizer, and gadolinia-doped ceria (GDC) in which gadolinia has been added in an amount of 5 to 10 mol % as a dopant. Also, in the case of YSZ, for instance, it is undesirable for the yttria content to be less than 5 mol % because the oxygen ion conductivity of the anode will decrease. Similarly, it is undesirable for the yttria content to be over 10 mol % because the oxygen ion conductivity of the anode will decrease. The same applies in the case of GDC.

The tube is preferably made of a composite consisting of a mixture of the anode material and the electrolyte material. The anode material is a metal selected from the group consisting of Ni, Cu, Pt, Pd, Au, Ru, Co, La, Sr, and Ti, and/or an oxide of one or more of these elements, and is a material that functions as a catalyst. More specifically, favorable examples include nickel (Ni), cobalt (Co), and ruthenium (Ru).

Of these, nickel (Ni) can be used to advantage because it is less expensive than other metals and has good reactivity with hydrogen and other fuel gasses. It is also possible to use a composite in which these elements or oxides are mixed. In a composite of the anode material and the electrolyte, the mix ratio of the former to the latter is preferably between 90:10 and 40:60 wt %. This is because such a range will afford a good balance between electrode activity, matching of coefficients of thermal expansion, and so forth. More preferably, the mix ratio of the former to the latter is between 80:20 and 45:55 wt %.

Meanwhile, a material with high activity in the ionization of oxygen is preferable as the cathode material, and a material made of one or more members of the group consisting of Ag, La, Sr, Mn, Co, Fe, Sm, Ca, Ba, Ni, Mg, and oxide compounds of these is particularly favorable. Of these, a transition metal perovskite oxide, and a composite of a transition metal perovskite oxide and an electrolyte material can be used favorably, for example.

When one of these composites is used, of the electron conductivity and oxygen ion conductivity that are characteristics required of a cathode, oxygen ion conductivity will be improved, so an advantage is that the oxygen ions produced by the cathode readily move to the electrolyte layer, and the cathode activity is enhanced.

When a composite of a transition metal perovskite oxide and a solid electrolyte material is used, the mix ratio of the form to the latter is preferably between 90:10 and 60:40 wt %. This is because such a range will afford a good balance between electrode activity, matching of coefficients of thermal expansion, and so forth. More preferably, the mix ratio of the former to the latter is between 90:10 and 70:30 wt %.

Favorable examples of transition metal perovskite oxides include $LaSrMnO_3$, $LaCaMnO_3$, $LaMgMnO_3$, $LaSrCoO_3$, $LaCaCoO_3$, $LaSrFeO_3$, $LaSrCoFeO_3$, $LaSrNiO_3$, $SmSrCoO_3$, and other such compound oxides.

As shown in FIG. 2, the anode exposed part 5 is formed by leaving part of the anode tube 2 exposed, without being covered by the electrolyte 1, at one end of the anode tube 2. This anode exposed part 5 functions as an external takeoff electrode of the anode. There are no particular restrictions on how much of the anode exposed part 5 is exposed, which can be suitably adjusted as dictated by the gas sealing member, the collection method of the electrode, the gas outlet channel, and other such factors.

Next, the method for constituting the above-mentioned tube-type electrochemical reactor cell as a bundle will be described. FIG. 3 illustrates an example of the basic structure of the electrochemical reactor bundle pertaining to the present invention. As shown in FIG. 3, with the electrochemical reactor bundle 11 of the present invention, tube cells 6 are housed in a porous collector 7 having a function of dissipating heat during cell operation and a function of collecting current from the cathode.

Here, air (oxygen) is introduced from the surface of the porous collector 7. The upper face and the cell protruding portion of the porous collector 7 are covered by a sealing layer 8 having a gas sealing and electrical insulation function. The tube cells 6 are connected by a metal or other such collecting member 9 via the anode exposed part, and are connected to a collector sheet 10.

A metal wire is preferably used as the collecting member here. Examples of the material of this collecting member include silver, nickel, copper, platinum, iron, and alloys of these, but there are no particular restrictions on the material of the collecting member as long as it has adequate electrical conductivity. Because the wire is wound around the tube cells, which have a sub-millimeter diameter, its diameter is preferably 0.5 mm or less, with 0.2 mm or less being even better.

It is effective here if the anode exposed part is pretreated with a metal paste or the like because this further reduces contact resistance. The collecting member is used under a fuel atmosphere, but because the metal wires are made from the above-mentioned metal, they can be used without problem at the working temperature of a fuel cell (400 to 800° C.).

FIG. 4 illustrates an example of the basic structure of a collecting method in which tube-type electrochemical reactor bundles are connected in series. Here, it is important to join the bundles at the side faces of the porous collectors 7. In this case, since one bundle has a voltage output of approximately 1 V, it is possible to construct a stack having a voltage output of 1 V×the number of stacked bundles.

The structure example in FIG. 4 is of when three bundles have been stacked, and an output of approximately 3 V can be anticipated. The best electrical connection is obtained by joining the bundles with metal paste or the like. With this collecting method, since air flows in the planar direction of the collector, pressure loss can be reduced to one-fifth or less as compared to existing products.

There are no particular restrictions on the number of bundles that are stacked, and it can be suitably determined according to the required output, the apparatus size, and so forth. Particularly when five tube cells with an 0.8 mm diameter are integrated in a porous collector 7 measuring 1 cm square and 2 mm thick, for example, five bundles can be serially integrated in a size of 1 $cm^3$. In this case, the usage volume can be kept to a minimum, while the desired voltage output design is still possible, so a tube-type electrochemical reactor bundle such as this is favorable in applications as a compact, low power consumption device.

Also, fuel gas can be introduced into the anode tube, and the electrochemical reactor unit 13 of the present invention constructed, by using fuel supply means for introducing fuel gas such as a fuel manifold 12 as shown in FIG. 4 and forming a fuel supply hole 14 and a fuel discharge hole 15. FIG. 5 illustrates an example of the structure of an electrochemical reactor unit in which a fuel supply pipe is mounted to the above-mentioned electrochemical reactor unit.

As shown in the drawing, the fuel supply pipe 17 has a fuel hole 16 for introducing fuel 18, and a hole in which the fuel manifold portion of the above-mentioned electrochemical reactor unit can be mounted is provided to the fuel supply pipe 17 (fuel supply means), so it is easy to stack electrochemical reactor units. This method makes it possible to construct an electrochemical reactor module 19.

FIG. 6 illustrates an example of the basic structure of an electrochemical reactor module disposed in a module case. An air inlet 21 and an air outlet 22 are formed in this module case, and air 20 is supplied to the entire module case 23 in which the module is housed, so air pressure loss can be kept to a minimum.

The operating temperature of the module can be controlled by means of the air flow amount and inlet temperature and the release of heat from the unit with respect to the amount of heat generated from the cells during operation. Specifically, There are no particular restrictions on the distance between units, the air flow amount, or the air inlet temperature in this electrochemical reactor module, which may be determined as desired according to the module temperature.

The unit spacing and air flow amount can be easily changed, and these can be suitably determined so as to attain the desired module operating temperature. With this structure, since no air manifold is necessary, the module can be more compact. Furthermore, in the structure example given above, an operation method was described in which the tube-type electrochemical reactor pertaining to the present invention was an SOFC and operated as a single unit, but this is not the only operation method that can be employed.

Next, the action of the electrochemical reactor unit and module pertaining to the present invention and the electrochemical reaction system made up of these will be described. The electrochemical reactor unit and module pertaining to the present invention have a structure that is simple and compact overall, and are characterized in that electrochemical reactor cells having a tube structure are integrated in a porous collector having a function of releasing heat during cell operation and a function of collecting current from the cathode, the tube structures are electrically connected in series, and a fuel manifold is mounted to this product.

In the past, it was difficult to achieve a cell stack in which high-performance cells with a tube diameter of just a few millimeters or less were efficiently integrated, and the structure shown in FIG. 7, in which a conventional module 24 having a fuel manifold 25 and an air manifold 26, has been previously proposed. The problems with this structure, however, are that air pressure loss is high and it is difficult to control the temperature of the module.

The units can be laid out as desired with the tube-type electrochemical reactor cell unit and module pertaining to the present invention, and an air channel can also be provided separately, so a better module can be designed according to the intended use and the operating temperature, and since no air manifold is necessary, for example, it is possible to construct a compact electrochemical reactor system with a higher output power per unit of volume.

Next, the basic method for manufacturing the tube-type electrochemical reactor cell and stack pertaining to the present invention will be described. The tube-type electrochemical reactor unit and module are basically produced by the following steps.

(1) A step of using bonding paste to mount the tube cells to the porous collector body, and firing.

(2) A step of constructing a sealing layer with respect to the tube faces and the side faces of the porous collector body.

(3) A step of bonding the tube ends (anode exposed parts) with metal or other such collecting member.

(4) A step of attaching a collector sheet over the sealing layer on the side faces of the porous collector body, and bonding with the metal or other collecting member that bonds the tube ends.

(5) A step of bonding the above-mentioned member with a conductive paste and mounting a fuel manifold to produce an electrochemical reactor unit.

(6) A step of mounting the resulting electrochemical reactor unit in fuel supply means, and electrically connecting the units.

The paste used in bonding the tube cells to the porous collector body preferably contains the same material as the porous collector body, and the porous collector body component preferably accounts for at least 50% after sintering. There are no particular restrictions on the sintering temperature as long as the temperature is sufficient to obtain good bond strength, but a range of 800 to 1200° C. is preferable.

There are no particular restrictions on the material of the sealing layer used on the tube faces and the upper face of the porous collector body, as long as it has gas sealing properties, but glass, a glass-ceramic composite, or the like is favorable. The softening point of the glass here must be higher than the operating temperature range of the system.

It is better for the glass not to contain lead or any alkali metals for the sake of fuel cell operation. When glass is used as the sealing layer, usually the porous collector body is coated with glass paste and then heat treated at a temperature over the melting point of the glass to construct the sealing layer.

There are no particular restrictions on the method for attaching the metal or other such collecting member, but an example is to wind a metal wire several times around the anode exposed part of the tube and then make a connection. The tubes are connected by a plurality of wires, and the wound metal wires are fixed to the anode tube with a conductive paste, which affords a more stable electrical connection.

With the present invention, if needed, the cathode or anode portion of the tube-type electrochemical reactor cell can be machined to plane it or adjust the dimensions. As to the length of the tube cells, since the anode portion must be exposed at one end of the cell, the length of that portion should be taken into account in determining the length of the cell cathode or electrolyte, but no particular restrictions are imposed.

In the present invention, the specific mode of the stack in which a manifold is used can be suitably designed as needed, and the mode is not limited to what is discussed here, and various shapes and structures of the fuel manifold having portions that support the gas introduction and discharge components can be designed and produced and used to produce a stack. For instance, a manifold that allows easy mounting of the porous collector body can be obtained by machining a ceramic tube (such as shaving the side faces). These can be connected by using a ceramic paste, glass paste, or the like.

Usually, when an electrochemical reactor is used for a fuel cell or the like, fuel and air are supplied to the electrochemical reactor and converted into electrical energy. Heat is generated in the electrochemical reactor by the electrochemical reaction that makes use of the oxygen partial pressure difference between the fuel and air, and controlling this heat is an important factor in the development of electrochemical reactors.

On the other hand, as electrochemical reactors become smaller and their performance increases, an increase in pressure loss in the supply of air to the electrochemical reactor becomes a major concern, and an increase in pressure loss reduces the energy efficiency of the system and also makes it more difficult to cool the module.

The cooling problem is solved by integrating electrochemical reactors having a tube structure with a porous material body having a function of collecting current from the air electrode and a function of releasing heat generated from the tube-type electrochemical reactor cells, and if these integrated reactors are connected serially in the direction of tube orientation, and a fuel manifold is then mounted, a unit can be obtained having a structure that allows the air manifold to be eliminated, and air pressure loss can be reduced by freely arranging these units.

Specifically, with the present invention, electrochemical reactor cells having a tube structure are arranged and integrated one-dimensionally with a porous material body having a heat releasing function and a current collecting function, a gas seal and a collecting member are attached to configure an integrated electrochemical reactor cell unit, and these are electrically connected in series in the direction of orientation of the tube-type electrochemical reactor cells to configure a bundle.

A tube-type fuel manifold is mounted to this bundle to configure an electrochemical reactor unit, a plurality of these electrochemical reactor units are arranged to configure an electrochemical reactor module, and air is supplied directly to this electrochemical reactor module.

With the present invention, since electrochemical reactor cells having a tube structure are integrated on a porous material body having a heat releasing function, it is easy to control the temperature of the units and module. Also, air pressure loss can be reduced, and it is possible to provide a highly efficient electrochemical reactor module. Also, an air module does not have to be provided to each unit as was necessary with conventional units, and the system can be made more compact, so it is possible to provide an electrochemical reaction system such as a solid oxide fuel cell that is compact and highly efficient.

With a conventional tube-type SOFC structure, the tube diameter is from 5 mm to several centimeters, and various methods have been proposed for stacking these. However, with microtube cells having a diameter of 2 mm or less, even effective cells themselves have not been reported, and it was difficult to use existing methods to integrate microtube cells with a diameter of from less than a millimeter up to 2 mm. Various kinds of integrated microtube cells have been reported (see FIG. 7), but with these structures it was difficult to reduce air pressure loss and to suppress heat generation in the stack during operation.

In contrast, when the method for microtube cell integration and collecting, the module, and the module construction method given in the present invention are used, a module can be designed with which it is easy to control heat and air pressure loss can be reduced, and as a result it is possible to provide a highly efficient fuel cell unit and to provide an electrochemical reaction system in which these units are used and the operation temperature can be lowered.

Also, using a manifold that combines the efficient layout of tube cells at the same time with the more compact configuration of the fuel gas introduction and discharge portions makes it possible to use an industrially versatile process and to reduce manufacturing costs. Examples of the electrochemical reaction system in which the above-mentioned tube-type electrochemical reactor module is used include solid oxide fuel cells (SOFC), exhaust gas purifying electrochemical reactors, and hydrogen manufacturing reactors. Using the above-mentioned electrochemical reactor cell stack makes it possible to construct and provide a highly efficient electrochemical reaction system.

The present invention has the following effects.

(1) The tube-type electrochemical reactor unit of the present invention comprises tube-type electrochemical reactor cells integrated in a porous material body having a heat dissipation function and a current collecting function, affording simple control of heat releasing during operation.

(2) Furthermore, since there are no restrictions on how the units are laid out, the product can be kept compact while reducing the air pressure loss to one-fifth or less as compared to existing products.

(3) An air manifold does not have to be provided to every bundle as was necessary up until now, so the structure of the module can be simplified.

(4) The construction of modules of from a few watts up to a few hundred watts can be easily accomplished depending on the simple stacking of electrochemical reactor units.

(5) The electrochemical reactor units can be laid out efficiently, the fuel gas introduction and discharge portions can be made more compact, a small yet high-performance electrochemical reactor module can be manufactured by an industrially versatile process, and consequently it is possible to provide a high-performance electrochemical reactor.

(6) An electrochemical reaction system such as a solid oxide fuel cell that can operate a low temperatures of 650° C. or lower can be provided by utilizing the above-mentioned tube-type electrochemical reactor cells.

(7) The electrochemical reaction system of the present invention can be used to advantage as an electrochemical reaction system that is useful in environmental purification apparatus and clean energy sources.

DESCRIPTION OF THE PREFERRED EMBODIMENTS

Next, the present invention will be described in specific terms on the basis of working examples, but the present invention is in no way limited by the following examples.

Working Example 1

In this working example, tube-type electrochemical reactor cells (see FIG. 7) were produced by the following procedure. First, nitrocellulose was added as a binder to a powder (made by Anan Kasei) having a composition of NiO (made by Wako) and $CeO_2$-10 mol % $Gd_2O_3$ (GDC), this was kneaded with water and put into a clay-like consistency, after which it was extrusion molded to produce a tubular molded article. The diameter and thickness of the tube thus obtained were 1 mm and 0.2 mm, respectively.

Next, the opening at one end of the tube was sealed with vinyl acetate, after which this tube was immersed in a slurry containing a solid electrolyte with a GDC composition, thereby dip coating a layer that would form an electrolyte layer, and obtaining an electrolyte-attached tube as an anode tube. The other end of the anode tube was left exposed for 3 mm, creating an anode exposed part.

Next, this tubular molded article was dried and then fired for 2 hours at 1400° C., which gave an electrolyte-attached porous anode tube. Then, GDC (electrolyte material) and $LaSrCoFeO_3$ (made by Nippon Ceramics) as the cathode material were put in a vessel, a paste containing these was produced, and the electrolyte layer face was coated with this paste and dried at 100° C., after which the coating was fired for 1 hour at 1000° C. This gage a tube-type electrochemical reactor cell. The tube diameter of the completed cell was 0.8 mm, and the tube thickness was 0.15 mm.

Following the same procedure as the production of the tube-type electrochemical reactor cell, $LaSrCoFeO_3$, a pore former, and nitrocellulose were kneaded with water and put into a clay-like consistency, after which this product was extrusion molded to produce a tubular molded article. This was sintered for 1 hour at 1400° C. to obtain a porous collector body. The size of the porous collector body here was 1×1×0.2 cm.

Five grooves with a diameter of 1 mm were formed in the porous collector body, tube cells were disposed and mounted in these, and the grooves were filled in with a paste containing $LaSrCoFeO_3$, after which this was sintered at 1000° C. to fix the tube cells. The porous collector body to which the tube cells had been mounted was coated with glass paste (made by Asahi Glass), and a sealing layer was formed on the upper face of the porous collector body and the faces where the tube cells stuck out. Silver wire (0.1 mm) was wound several times around the anode exposed part, and then directly wound around the adjacent tube cell, and by this method a structure was produced in which five tube cells were electrically joined per bundle.

Figure 1:
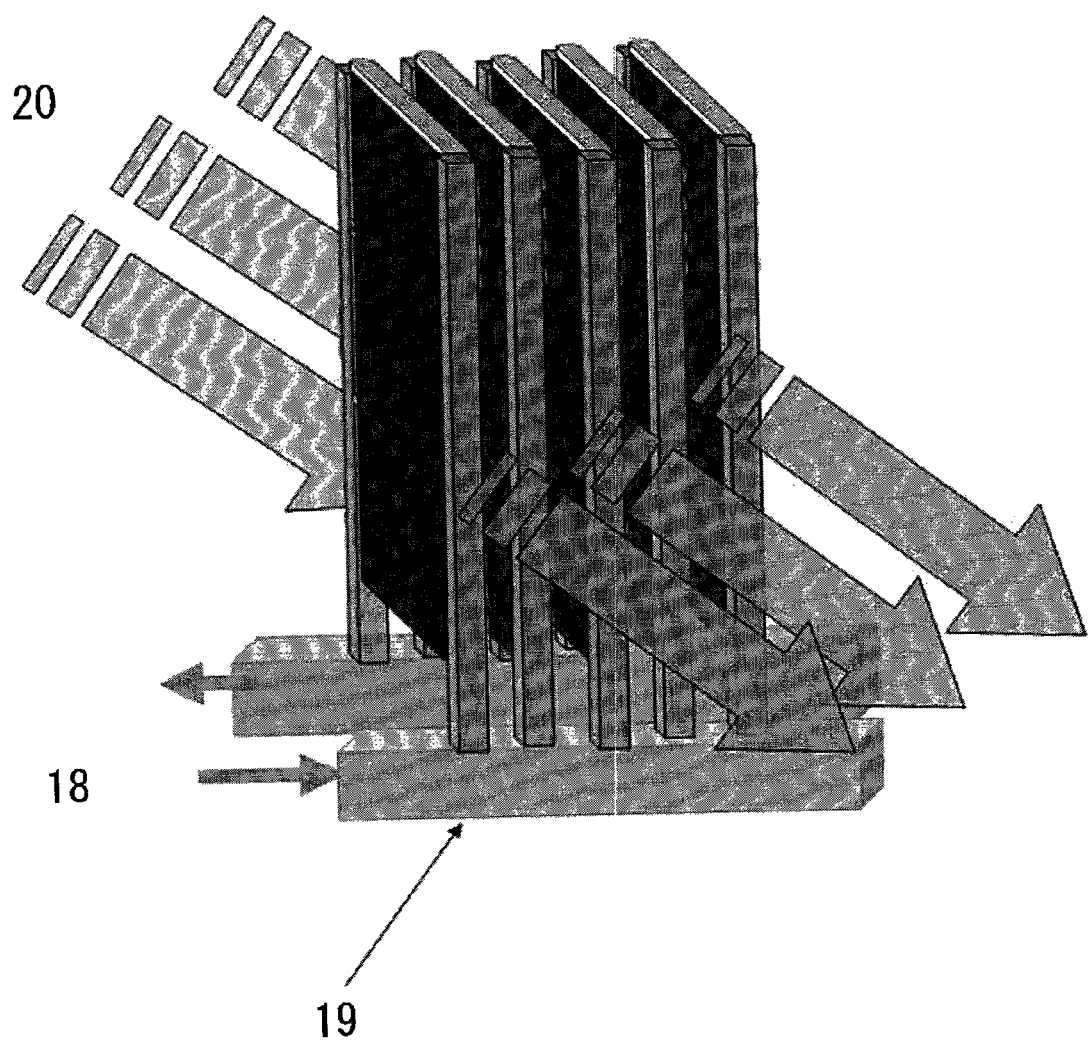
FIG. 1 illustrates an example of the structure of the electrochemical reactor module pertaining to the present invention.
Figure 2:
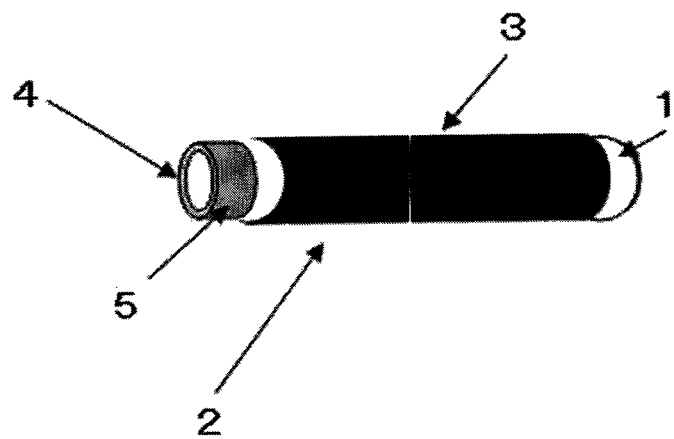
FIG. 2 is a simplified diagram of the tube-type electrochemical reactor cell pertaining to the present invention.
Figure 3:
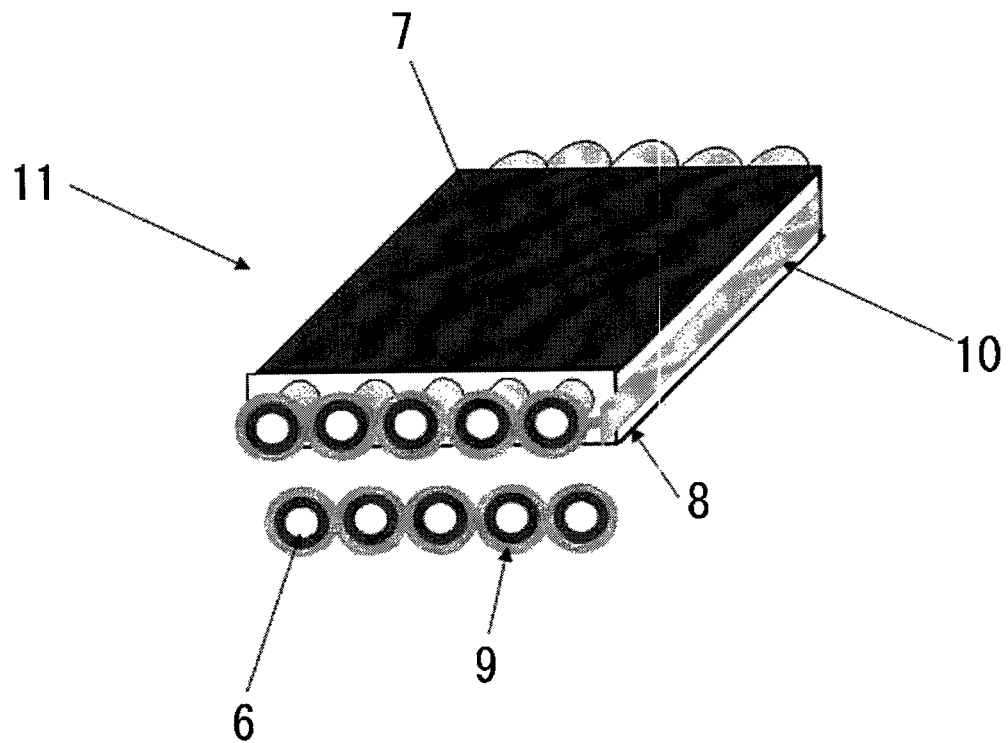
FIG. 3 illustrates an example of the structure of the electrochemical reactor bundle pertaining to the present invention.
Figure 4:
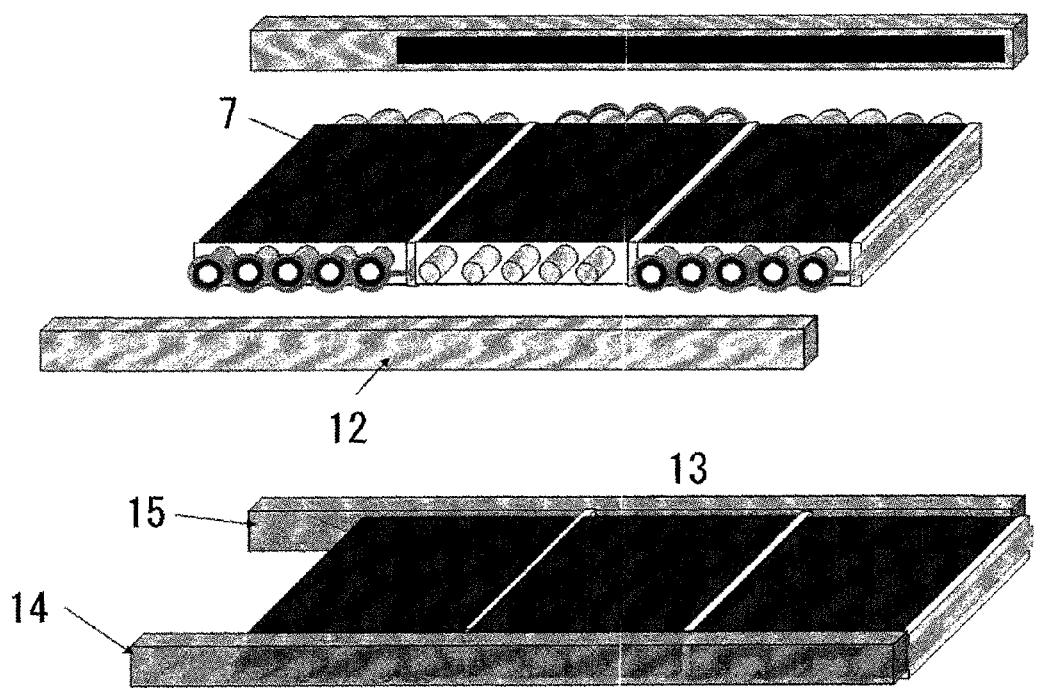
FIG. 4 illustrates an example of the structure of the electrochemical reactor unit pertaining to the present invention.
Figure 5:
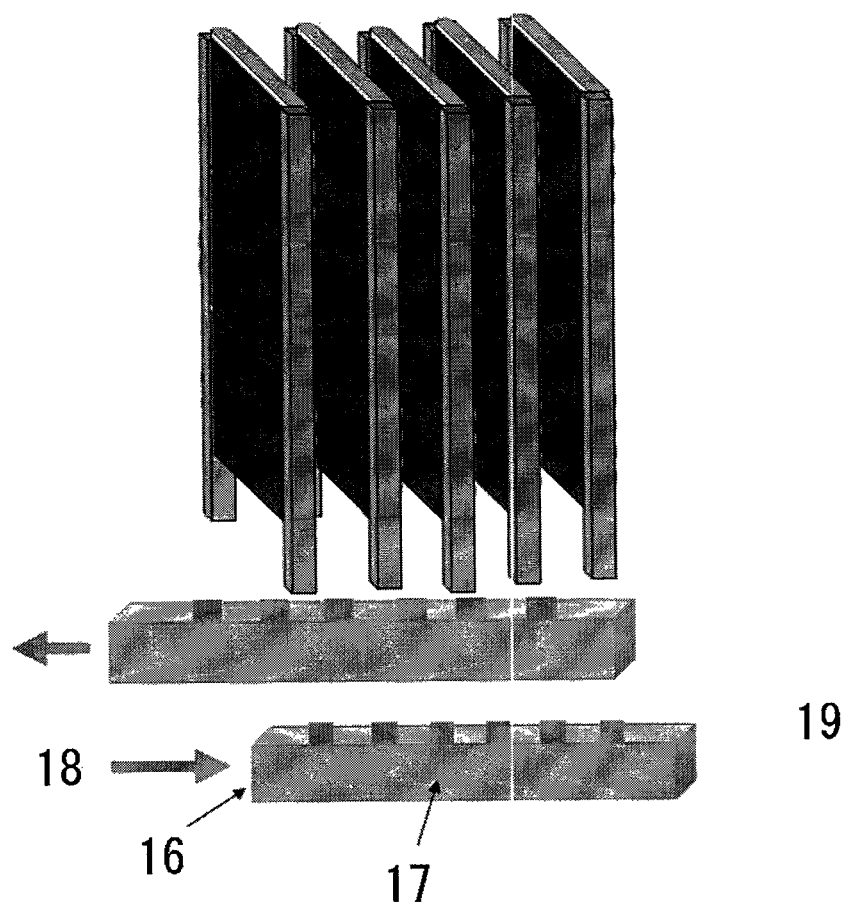
FIG. 5 illustrates an example of the structure of an electrochemical reactor unit in which a fuel supply pipe is mounted to the above-mentioned electrochemical reactor unit.
Figure 6:
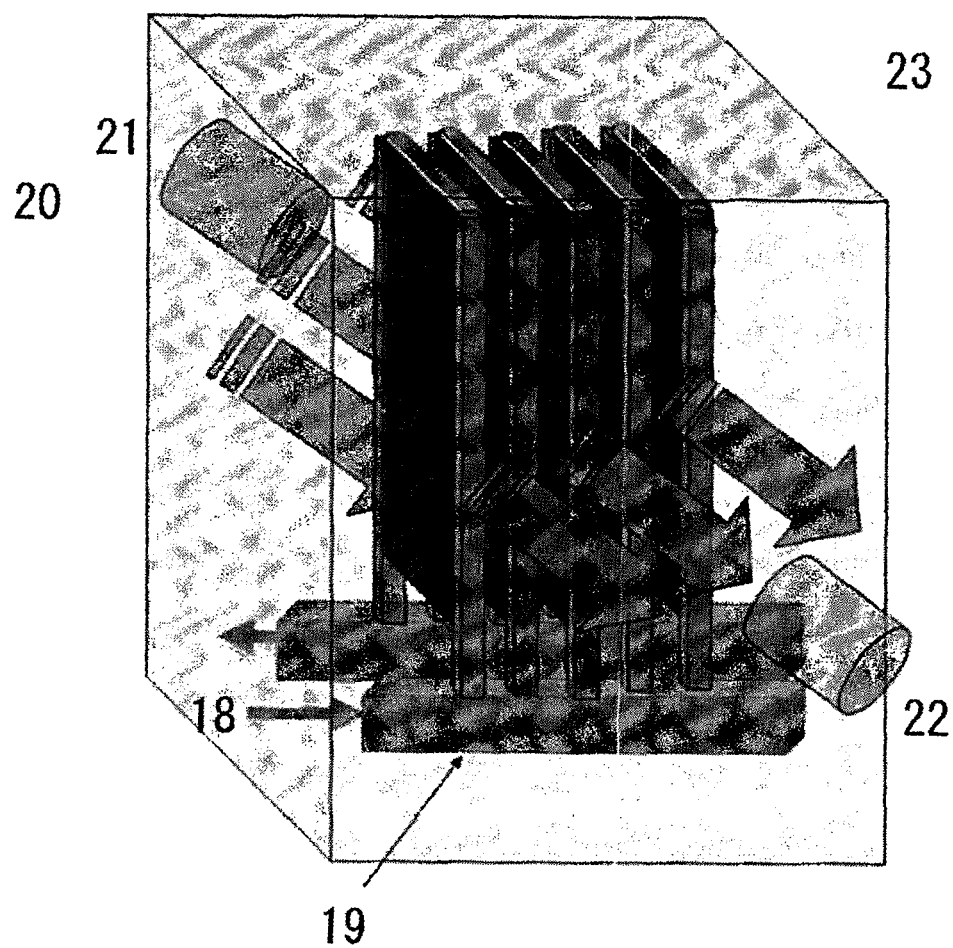
FIG. 6 illustrates an example of the structure of the electrochemical reactor module pertaining to the present invention disposed in a module case.
Figure 9:
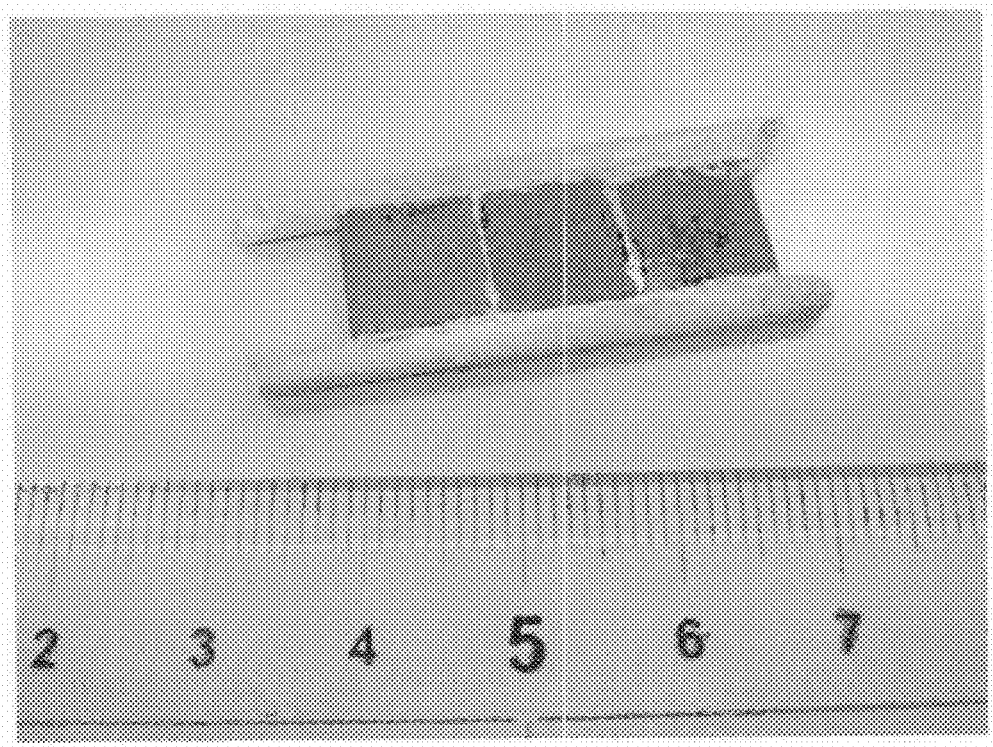
FIG. 9 is a photograph of the electrochemical reactor unit pertaining to the present invention (a three-stage stack whose basic structure is a bundle made up of five tube cells)

Three of these structures were lined up and electrically connected in series with conductive paste, to which was mounted a fuel manifold made from aluminum tubing, thereby producing an electrochemical reactor unit (see FIGS. 4 and 9). The above-mentioned electrochemical reactor units were mounted in a fuel supply pipe, the various units were electrically connected to produce an electrochemical reactor module, and this module was housed in a module case having an air inlet and an air outlet (see FIGS. 5 and 6).

Working Example 2

Figure 10:
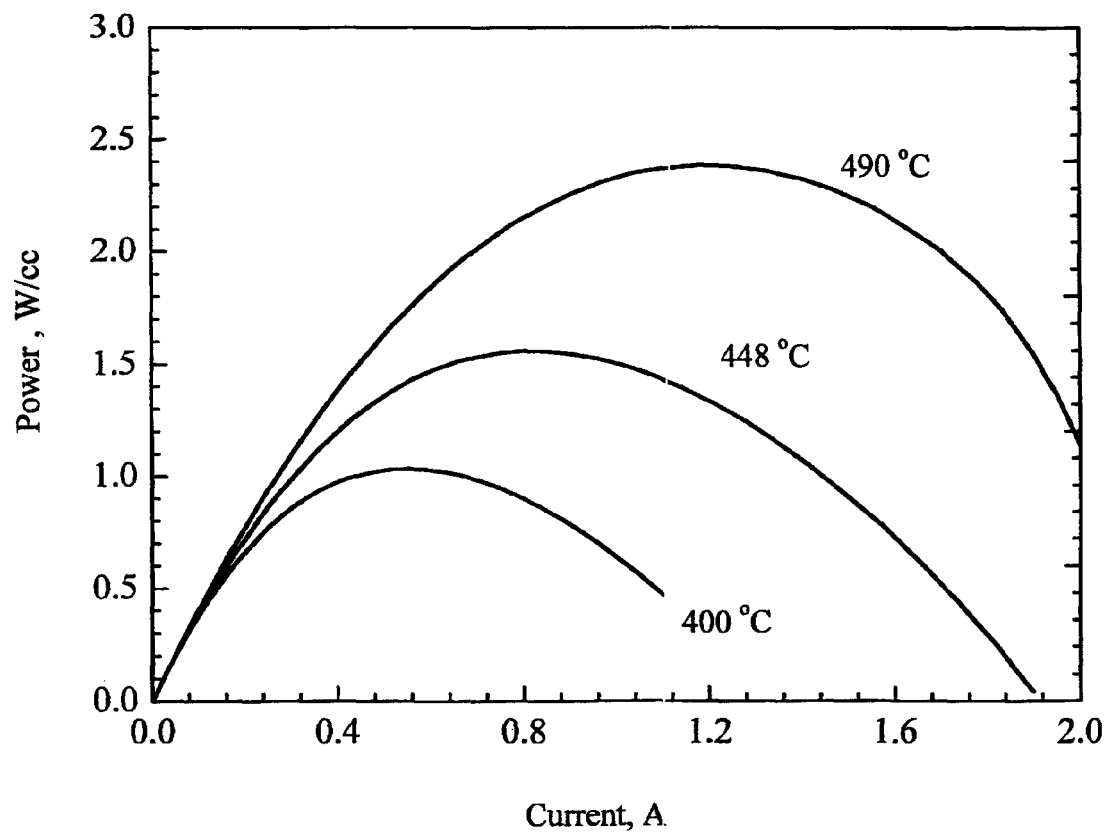
FIG. 10 is a graph of the results of a power generation performance test of the electrochemical reactor unit shown in FIG. 9.

The tube-type electrochemical reactor units obtained in Working Example 1 above were connected to a gas introduction pipe. The connected part was sealed with ceramic paste, and hydrogen and air were supplied as fuel gasses to the tube-type electrochemical reactor unit. FIG. 10 shows the results of a power generation performance test of the above-mentioned electrochemical reactor unit at a temperature of 400 to 490° C. It was proven that the tube-type electrochemical reactor unit of the present invention can generate a power output of at least 2.5 W/cc per unit, even at low temperatures of 500° C. or lower.

Working Example 3

Figure 7:
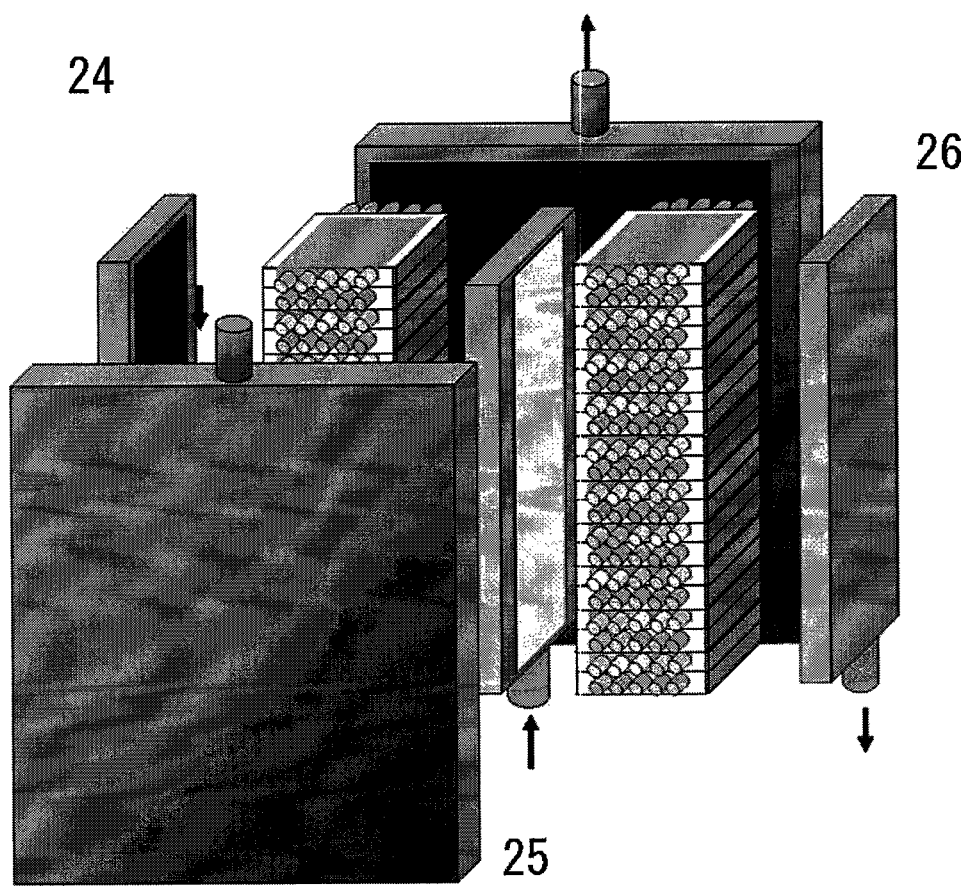
FIG. 7 illustrates an example of the structure of a conventional tube-type electrochemical reactor stack.
Figure 8:
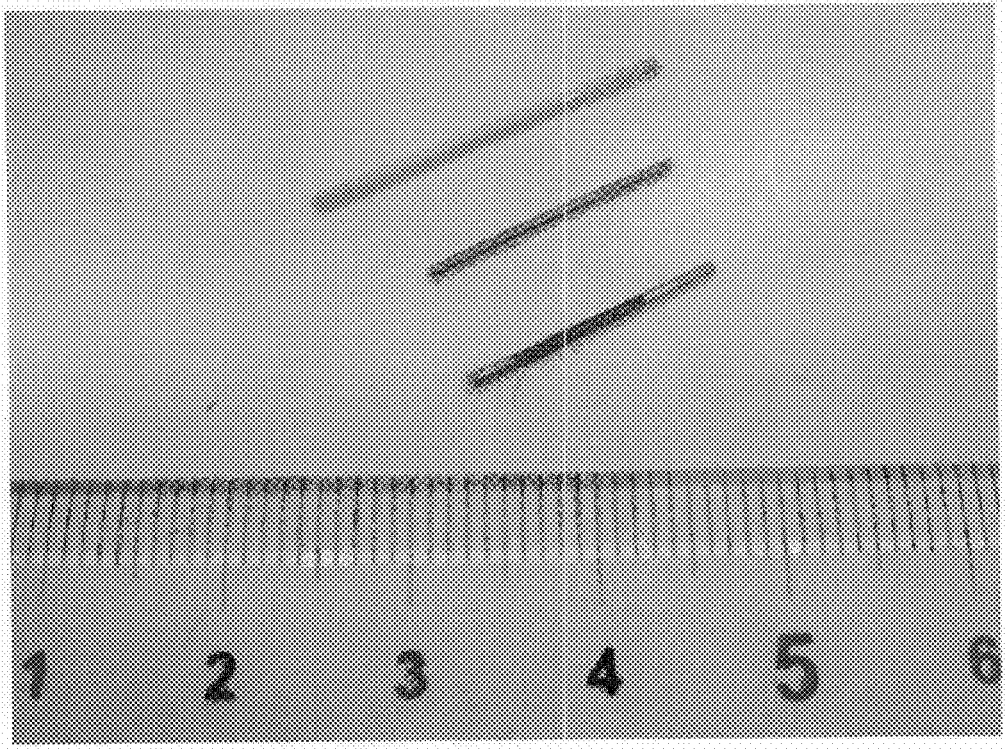
FIG. 8 is a photograph of the process of manufacturing the tube-type electrochemical reactor cells of the present invention.

The air pressure loss with the tube-type electrochemical reactor units obtained in Working Example 1 above was compared with that of a conventional tube-type electrochemical reactor structure produced by a conventional method (see FIG. 7). The gas permeation coefficient of the porous collector body was measured at room temperature and found to be $6.2 \times 10^{-4}$ mL cm $cm^{-2}$ $sec^{-1}$ $Pa^{-1}$. This value was used to find the pressure loss at 550° C. for the shape of the units of the present invention and the shape obtained by the conventional method.

Figure 11:
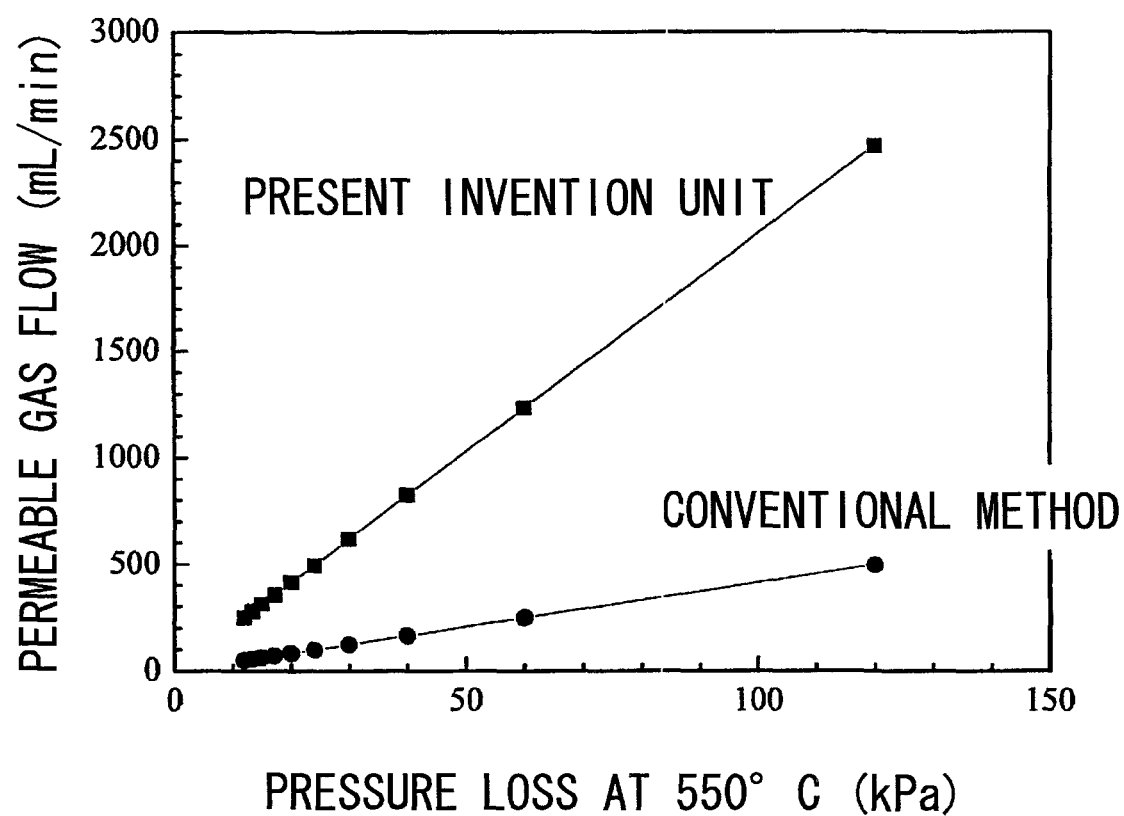
FIG. 11 is a graph of the gas flow that can permeate with the electrochemical reactor unit shown in FIG. 9, as a function of pressure loss.

FIG. 11 is a graph of the gas flow that can permeate with the electrochemical reactor unit, as a function of pressure loss. This graph shows the gas flow that can permeate at a given pressure differential, and with the units of the present invention, it was found that gas can permeate at a high flow rate even at a low pressure differential. This suggests that controlling the air flow will be easy, which tells us that temperature control will be even simpler.

Working Example 4

Cells with a tube diameter of 2 mm were produced according to Working Example 1, after which these tube cells were disposed in an $LaSrCoFeO_3$ porous collector in which three grooves with a diameter of 2 mm had been formed, and the grooves were filled in with a paste containing LaSrCoFeO$_3$, after which this was sintered at 1000° C. to fix the tube cells. The porous collector to which the tube cells had been mounted was coated with glass paste (made by Asahi Glass), and a sealing layer was formed on the upper face of the porous collector and the faces where the tube cells stuck out.

Figure 12:
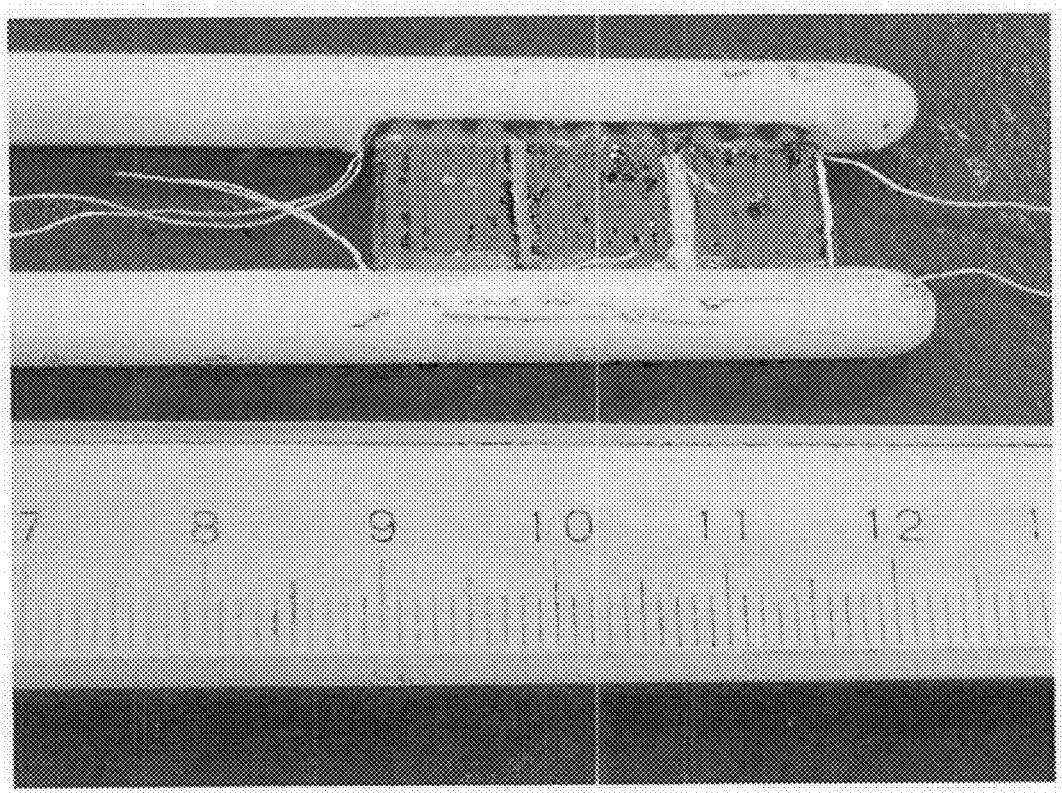
FIG. 12 is a photograph of the electrochemical reactor unit pertaining to the present invention (a three-stage stack whose basic structure is a bundle mace up of three tube cells with a diameter of 2 mm)

Silver wire (0.2 mm) was wound several times around the anode exposed part, and then directly wound around the adjacent tube cell, and by this method a structure was produced in which three tube cells were electrically joined per bundle. Three of these structures were lined up and electrically connected in series with conductive paste, to which was mounted a fuel manifold made from aluminum tubing, thereby producing an electrochemical reactor unit (see FIG. 12).

Working Example 5

Figure 13:
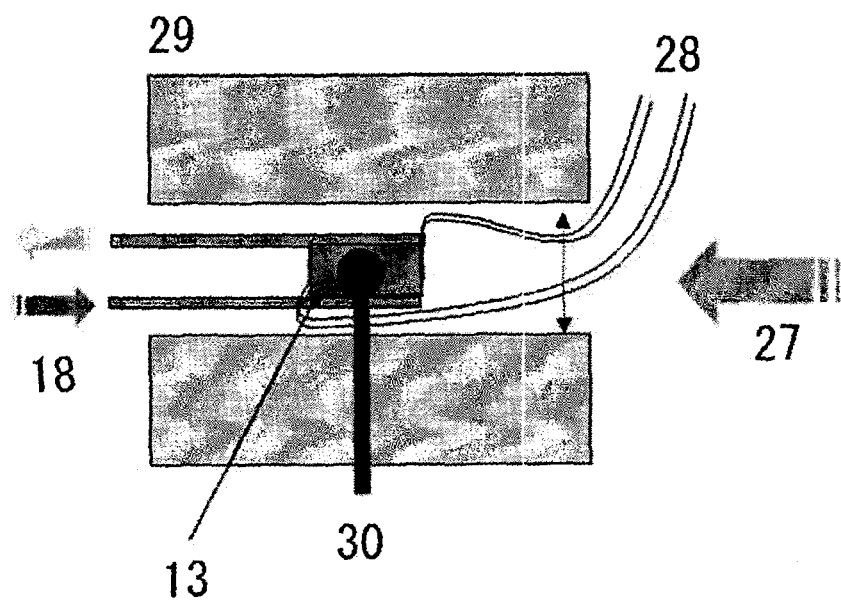
FIG. 13 is a simplified diagram of an evaluation of the electrochemical reactor unit pertaining to the present invention.

The tube-type electrochemical reactor unit obtained in Working Example 4 above was connected to a gas introduction pipe, and this unit 13 was installed in an electric furnace 29 as shown in FIG. 13. Here, air was supplied by natural convection 27 alone from an inlet/outlet in the electric furnace. Specifically, the air supply method involved keeping energy loss to the lowest level. Hydrogen was supplied as the fuel gas to this tube-type electrochemical reactor unit.

Figure 14:
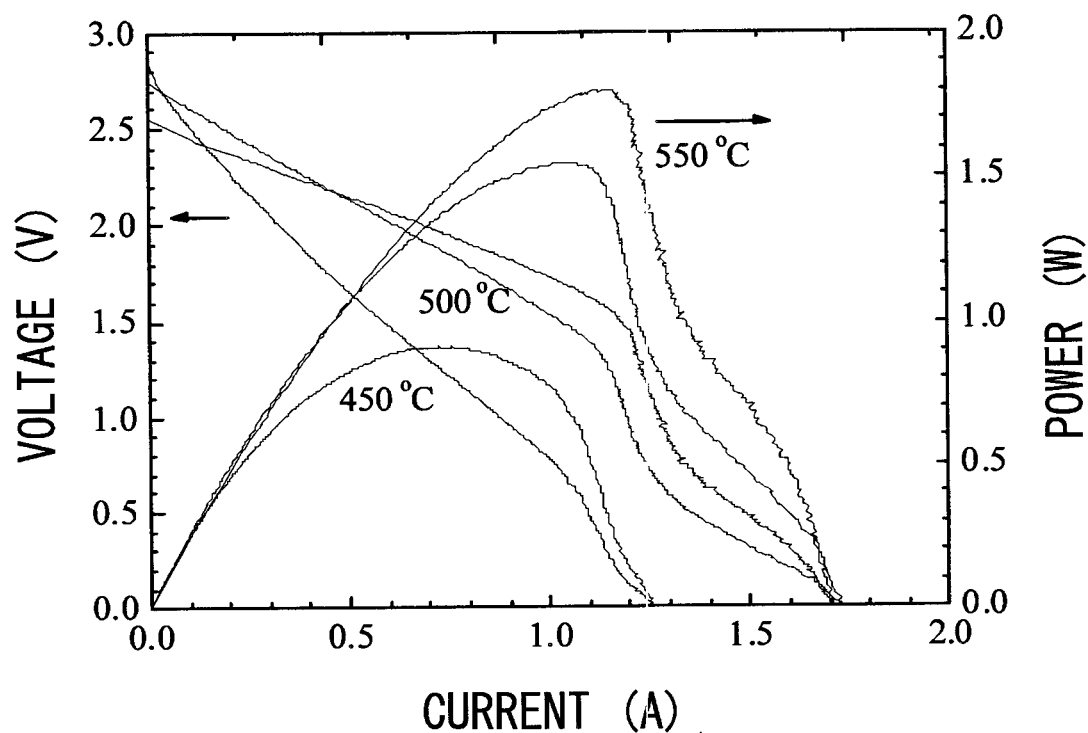
FIG. 14 is a graph of the test results at 450 to 500° C. and under the evaluation conditions shown in FIG. 13, at the unit temperature of the electrochemical reactor unit pertaining to the present invention (a three-stage stack whose basic structure is a bundle made up of three tube cells with a diameter of 2 mm)

FIG. 14 shows the results of a power generation performance test for the tube-type electrochemical reactor unit at a temperature of 450 to 550° C. The open-electromotive force had a voltage value of 2.8 to 2.55 V at an operating temperature of 450 to 550° C., and exhibited a value that can be predicted from a single cell. At an operating temperature of 500° C., even under conditions in which air is not supplied directly, it was proven that a power output of at least 1.5 W/cc could be obtained per unit, and at 550° C., good power generation performance of 1.7 W/cc was obtained.

Figure 15:
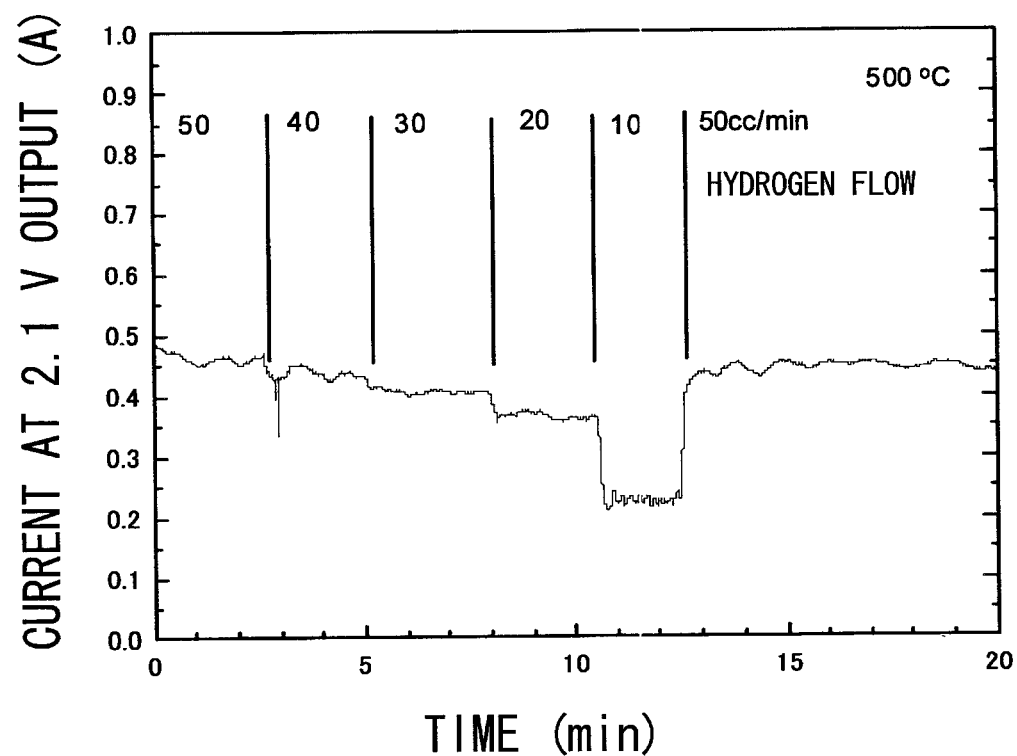
FIG. 15 shows the change over time in the output current with respect to the fuel flow at 2.1 V and 500° C. with the electrochemical reactor unit pertaining to the present invention (a three-stage stack whose basic structure is a bundle made up of three tube cells with a diameter of 2 mm)

FIG. 15 shows the change over time in an output current at 2.1 V and 500° C. The current output varies with good response with respect to changes in the fuel flow, and stable output was exhibited at all flow rates. Since the performance of a tube-type electrochemical reactor unit is greatly dependent on the hydrogen gas flow, optimizing the fuel flow is expected to yield further performance gains.

Working Example 6

An evaluation was conducted under the conditions given in Working Example 5 for the tube-type electrochemical reactor unit obtained in Working Example 1 (with a one-stage unit made up of five tube cells with a diameter of 0.8 mm). The volume of the unit obtained in Working Example 1 was 0.6 cc, and a test at different hydrogen flow rates was conducted at test temperatures of 500° C. and 550° C.

Figure 16:
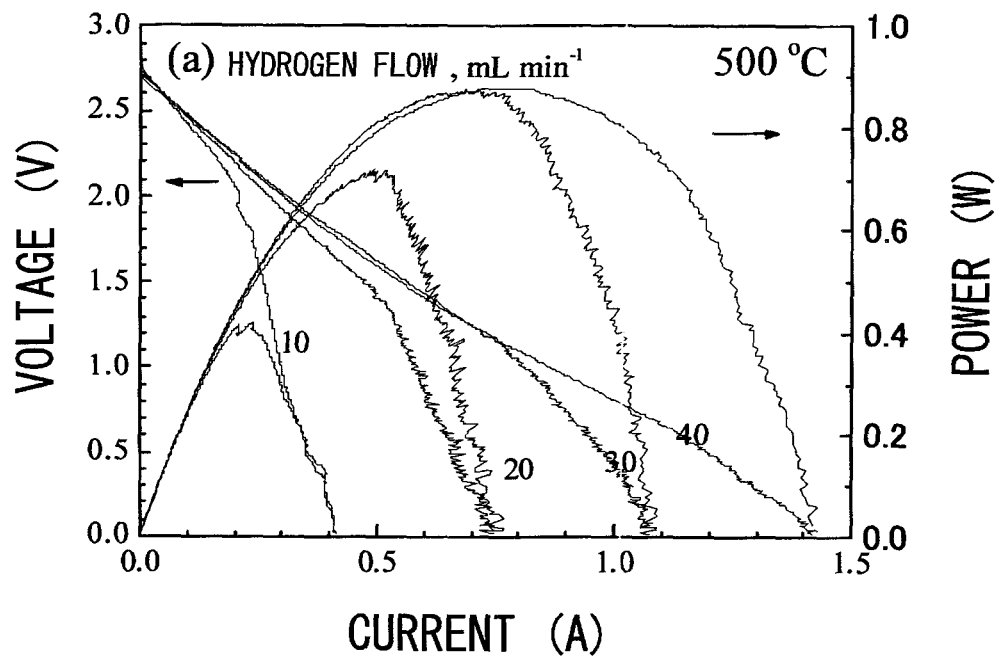
FIG. 16 shows the test results at (a) 500° C. and (b) 550° C. in the evaluation method shown in FIG. 13, at the unit temperature of the electrochemical reactor unit pertaining to the present invention (a three-stage stack whose basic structure is a bundle made up of five tube cells with a diameter of 0.8 mm).
Figure 16:
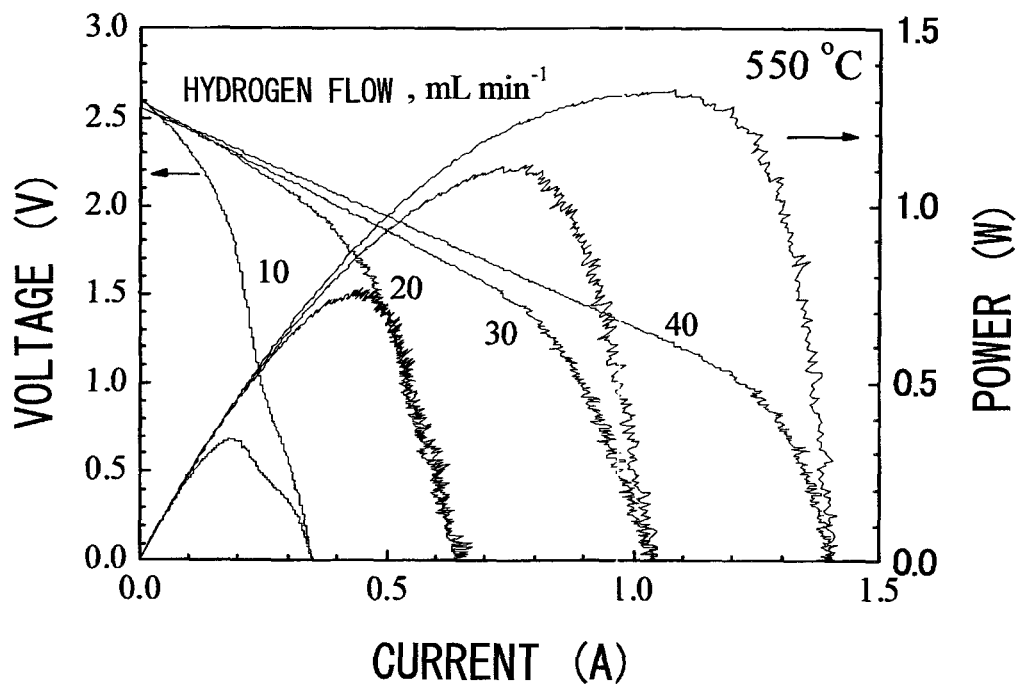

FIG. 16 shows these results. At 500° C., a maximum output of 0.9 W (1.5 W/cc) was obtained, and 1.4 W (2.3 W/cc) at 550° C., and a high power generation density was obtained that exceeded that of an electrochemical reactor unit composed of tubes with a diameter of 2 mm. This evaluation suggests that energy loss due to air supply can be kept to a minimum, and that the range of industrial applicability was expanded.

Working examples of the tube-type electrochemical reactor unit and module of the present invention were described in specific terms above, but with the present invention, for example, the units and module produced in the working examples above can be further stacked and the resulting module used to construct and produce an electrochemical reaction system as desired.

As detailed above, the present invention pertains to an electrochemical reactor unit constituted by tube-type electrochemical reactor cells, and to an electrochemical reaction system constituted by this, and with the electrochemical reactor unit of the present invention, microtube-type ceramic reactor cells can be efficiently made into modules, and a compact and highly efficient SOFC can be constructed. Employing the above configuration makes it possible to lower the operating temperature to 650° C. or lower even when conventional materials are used, making it possible to produce and provide an electrochemical reactor module with superior cost performance, and a solid oxide fuel cell or other such electrochemical system in which this is utilized.

Also, with the present invention, by taking utilizing a manifold that simultaneously achieves efficient layout of the electrochemical reactor units and a reduction in the size of the fuel gas introduction and discharge portions, an industrially versatile process can be used, manufacturing costs can be cut, and a high-performance electrochemical reactor can be provided. The present invention is useful at providing new technology and new products related to a new type of electrochemical reactor unit featuring tube cells and to solid oxide fuel cells and other such electrochemical reaction systems in which these electrochemical reactor modules are used.

What is claimed is:

1. An electrochemical reactor module, comprising:
   a plurality of electrochemical reactor units (13) consisting of bundles (11) arranged in fuel supply holes (14) of a fuel supply means, and
   a structure for supplying air directly to the entire electrochemical reactor module (19),
   wherein the electrochemical reactor units (13) are mounted with changeable unit spacing to control air flow amount and mounted to a fuel supply pipe (17),
   wherein the electrochemical reactor bundle (11) comprises a plurality of tube-type electrochemical reactor cells (6) constituted by a tube with a micro-size diameter and having a tube structure which cells are housed in a porous material body as a porous collector (7) in which the tube-type electrochemical reactor cells are oriented in one dimensional direction and are arranged on a plane having protruding anode exposed parts (5) of the cells, wherein the cells are electrically connected in series,
   wherein the tube structure is an anode tube structure constituting an anode tube (2), an electrolyte layer (1) on the anode tube and a cathode (3) is disposed on the outside of electrolyte (1), the anode exposed part (5) on which no electrolyte is laminated is formed at one end of the anode tube (2), the thickness of the tube is at most 0.5 mm, and the diameter of the tube is micro-size being no more than 2 mm,
   wherein the upper face of the porous collector (7) is covered by a sealing layer (8), the tube cells (6) are connected by a metal wire of a collecting member (9) wound around the anode exposed parts (5) and are connected to a collector sheet (10), and
   wherein the electrochemical reactor module (19) is disposed in a module housing case (23), and
   wherein an air inlet (21) and an air outlet (22) are formed in said housing case (23) so that air (20) is supplied directly to the entire module (19).

2. An electrochemical reaction system that comprises the electrochemical reactor module of claim 1, having an operating temperature of no higher than 650° C.

3. The electrochemical reaction system of claim 2, wherein the electrochemical reaction system is a solid oxide fuel cell, or a system for cleaning exhaust gases, a system for manufacturing hydrogen, or a system for manufacturing synthesis gas.

4. An electrochemical reactor module according to claim 1, wherein the electrochemical reactor cells are one-dimensionally arranged and integrated on the porous collector collecting current from the cathode and releasing heat during cell operation.

5. An electrochemical reactor module according to claim 1, wherein the porous material body as the porous collector comprises a metal and/or a conductive ceramic.

6. The electrochemical reactor module of claim 2, wherein the fuel supply means is a tube-type fuel manifold.

* * * * *